United States Patent
Yen et al.

(10) Patent No.: US 9,652,436 B1
(45) Date of Patent: *May 16, 2017

(54) GAMES, PRIZES, AND ENTERTAINMENT FOR POWERED CARDS AND DEVICES

(71) Applicant: Dynamics Inc., Cheswick, PA (US)

(72) Inventors: Philip W. Yen, Cupertino, CA (US); Jeffrey D. Mullen, Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,814

(22) Filed: Feb. 8, 2013

Related U.S. Application Data

(63) Continuation of application No. 12/911,074, filed on Oct. 25, 2010, now Pat. No. 8,393,546.

(60) Provisional application No. 61/254,727, filed on Oct. 25, 2009.

(51) Int. Cl.
| | |
|---|---|
| *G06K 19/00* | (2006.01) |
| *G06F 17/00* | (2006.01) |
| *G07F 17/32* | (2006.01) |
| *G07F 7/08* | (2006.01) |

(52) U.S. Cl.
CPC ............ *G06F 17/00* (2013.01); *G07F 7/0806* (2013.01); *G07F 7/0833* (2013.01); *G07F 17/3202* (2013.01); *G07F 17/329* (2013.01)

(58) Field of Classification Search
USPC .......................................................... 44/487
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.
(Continued)

*Primary Examiner* — Christle I Marshall

(57) ABSTRACT

Advanced payment applications are provided to improve the functionality of cards and devices. For example, a user interface may be placed on a card (e.g., a physical button) or a telephonic device (e.g., a virtual button on a capacitive touch screen). Manual input provided to this user interface may, for example, cause a purchase to be paid by credit and points may be earned for the purchase. A different manual input may, for example, cause a purchase to be paid by credit and points not be earned for the purchase in exchange for one or more chances to win a prize in a random lottery. An instant winner functionality may be provided on a card. For example, a card may randomly become an instant winner based on, for example, time and/or use.

23 Claims, 5 Drawing Sheets

(56) References Cited

U.S. PATENT DOCUMENTS

| | | |
|---|---|---|
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B2 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,946,501 B2 | 5/2011 | Borracci |
| 7,954,705 B2 | 6/2011 | Mullen |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,382,000 B2 | 2/2013 | Mullen et al. |
| 8,393,545 B1 | 3/2013 | Mullen et al. |
| 8,393,546 B1 * | 3/2013 | Yen et al. .............. 235/487 |
| 8,413,892 B2 | 4/2013 | Mullen et al. |
| 8,424,773 B2 | 4/2013 | Mullen et al. |

(56) References Cited

U.S. PATENT DOCUMENTS

| | | |
|---|---|---|
| 8,459,548 B2 | 6/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,579,203 B1 | 11/2013 | Lambeth et al. |
| 8,590,796 B1 | 11/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,881,989 B2 | 11/2014 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,064,255 B1 | 6/2015 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0116285 A1* | 5/2008 | Shoemaker .................. 235/493 |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2008/0308627 A1* | 12/2008 | Sines et al. .................. 235/380 |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159709 A1 | 6/2009 | Mullen |
| 2009/0159710 A1 | 6/2009 | Mullen et al. |
| 2009/0159712 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2011/0028184 A1 | 2/2011 | Cooper |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272477 A1 | 11/2011 | Mullen et al. |
| 2011/0272478 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0278364 A1 | 11/2011 | Mullen et al. |
| 2011/0282753 A1 | 11/2011 | Mullen et al. |
| 2012/0286037 A1 | 11/2012 | Mullen et al. |
| 2012/0318871 A1 | 12/2012 | Mullen et al. |

(56) References Cited

U.S. PATENT DOCUMENTS

2013/0020396 A1    1/2013   Mullen et al.
2013/0282573 A1   10/2013   Mullen et al.
2013/0282575 A1   10/2013   Mullen et al.

FOREIGN PATENT DOCUMENTS

WO       WO247019        6/2002
WO       WO2006066322    6/2006
WO       WO2006080929    8/2006
WO       WO2006105092   10/2006
WO       WO2006116772   11/2006
WO       WO2008064403    6/2008

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
PCT/US11/25047, Feb. 16, 2011, Mullen.
PCT/US11/37041, May 18, 2011, Mullen et al.
PCT/US11/45991, Jul. 29, 2011, Mullen et al.
PCT/US12/31919, Apr. 2, 2012, Mullen et al.
PCT/US12/31921, Apr. 2, 2012, Mullen et al.
PCT/US12/37237, May 10, 2012, Mullen et al.
PCT/US13/26746, Feb. 19, 2013, Mullen et al.

\* cited by examiner

GAMES, PRIZES, AND ENTERTAINMENT FOR POWERED CARDS AND DEVICES

CROSS-REFERENCE TO RELATED APPLICATION

This application is a continuation of U.S. patent application Ser. No. 12/911,074, filed on Oct. 25, 2010, which claims the benefit of U.S. Provisional Patent Application No. 61/254,727, titled "Games, Prizes, and Entertainment for Powered Cards and Devices," filed Oct. 25, 2009, each of which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., after a read-head detector on the card detects a read-head of a magnetic stripe reader). The code may be indicative of a user pressing a particular button on a card or other device.

A card may be provided with two buttons. One button may, for example, be utilized for a user to communicate information through a card indicative of a user's desire to pay for a purchase with credit. In turn, the user may earn points proportional to the dollar amount of the purchase. Another button may be provided indicative of a user's desire to pay for a purchase with credit, but foregoing the earning of points. In exchange for foregoing points, the user may be provided with one, or more, chances to win one or more prizes. The number of chances earned, for example, may be proportional to the amount of the purchase. The chances to win may be provided at purchase authorization or purchase settlement. Prizes may be provided at purchase authorization or purchase settlement. Particularly, magnetic stripe information associated with a user's desire to forego points for chances to win prizes may be communicated via a magnetic stripe message (e.g., discretionary data in a magnetic stripe message). This discretionary data may be communicated at payment authorization or settlement to an entity (e.g., card issuer) with servers managing the chances to win and/or prizes.

An instant winner functionality may be provided on a card or other device (e.g., a mobile telephonic device). For example, a card may utilize read-head detectors to determine when the card is swiped by a user. An algorithm may reside on a card that provides the card with a chance to be an instant winner with every swipe. Such an algorithm may, for example, randomly pre-determine particular swipes that are instant winners. Alternatively, for example, such an algorithm may, for example, randomly determine, independently after each swipe, whether the card is an instant winner. An instant winner may be determined, for example, based on time. For example, an algorithm may provide an instant winner on the swipe after a particular period of time passes. A card may also, for example, determine if an instant winner has occurred based on the activation of a card (e.g., a user turning a card ON by pressing a button or entering a particular sequence of manual input into an array of buttons on the card).

An instant winner may, for example, display a winning code on a display of a card that may be entered, for example, on a website (e.g., an account page of the user). The code may correlate to a particular prize. Alternatively, for example, the code may be utilized to win a prize that is chosen randomly by the website.

A user may be provided with a code for entry into a card (or other device) with a purchase. Such a code may be provided via a printed, online, or emailed receipt. Accordingly, particular merchants may fund prize-based games and provide codes for use with such prize-based games. Accordingly, for example, a user may enter a code using buttons on a card. The card may, in turn, utilize the code with an instant winner algorithm. The algorithm may, for example, utilize the game code to randomly, independently, determine whether a card is an instant winner. The algorithm may, for example, utilize the game code to increase the count of received game codes (where an instant winner is triggered based on a pre-determined count). The algorithm may, for example, utilize the game code to translate the game code into a prize code (e.g., for entry onto an online website).

Both the game code and the prize code may be utilized online, for example, to redeem a prize via a remote server (e.g., of a card issuer). A prize may take many forms such as, for example, gift certificates, particular amounts of points, plane tickets, statement credits, coupons, discounts, or hotel stays.

A remote server may keep count of the transactions processed for a card. An instant winner algorithm on a card may be similar to an instant winner algorithm on a remote server. Accordingly, such an instant winner algorithm may be tamper-proof for algorithms that, for example, determine a winner based on transactions. A card that is swiped more times than transactions occur may notify a user of an instant winner before the user is actually an instant winner. Accordingly, a remote server may include a range of transactions in which an instant winner code can be redeemed. Moreover, the remote server may notify a user that the instant winner code was redeemed earlier than expected by the remote server and may, therefore, deny the redemption until the appropriate number of transactions have been processed.

A user may associate a telephone number of his/her mobile telephonic device to a card on a remote server (e.g., the server of a card issuer). Accordingly, an instant winner message may be communicated (e.g., via an email or text message) to the mobile telephonic device at purchase authorization or settlement. Similarly, a user may associate an email address to a card on a remote server (e.g., the server of a card issuer). In doing so, for example, an instant winner message may be communicated to the email address. An instant winner message may include a description of the prize and instructions for redeeming the prize (e.g., a prize code).

An instant winner may be determined, for example, based at least in part on time. Particularly, a card may be programmed with a pre-determined set of time periods in which an instant win occurs. When an instant win occurs, for example, an instant winner code may be provided (e.g., via a display on a card). Alternatively, for example, no code may be provided. A remote server may be synched with the card, with respect to time, such that a user merely logs into his/her account webpage to receive information about the instant win. An instant win based on time (or any other instant win) may, for example, expire. For example, the instant win for a card may expire within 24, 48, or 72 hours. An instant win may be recognizable by a user by, for example, a particular screen on a display or the activation of one or more sources of light (e.g., LEDs). For example, a source of light may blink during the redemption period of an instant win. So long as, for example, the user goes online to his/her account webpage for the card within the redemption period, the user may obtain a prize associated with the instant win. The prize may be chosen randomly.

Prizes may be tiered and may be associated with, for example, the type of card a user carries (e.g., a card with a certain annual fee may have a different prize tier than a card with a different annual fee). Prizes may be tiered based on, for example, the amount of transaction volume associated with a card for a period of time (e.g., the preceding year). Users may also purchase higher tiers of prizes with points. The same prizes may be offered in all tiers, but the odds of winning higher value prizes may change with each tier. Prizes may also correlate to the transaction volume and/or the type of merchant for a particular purchase that triggered, for example, an instant win. For example, a $10 purchase at a gas station may provide a different prize than a $10 purchase at a fast food restaurant. Prizes may be proportional to the amount of a particular purchase and may be associated with a particular type of transaction. For example, a prize may be a particular percentage (e.g., approximately 5-25% such as approximately 10%) off the next purchase a user makes in the merchant category associated with the prize. A user may be notified of the type of prize at time of winning the prize or at a time after the prize is redeemed. If the user is aware that he/she has won a prize, but does not know what the prize is, the user may functionally receive a whimsical and festive benefit from the prize on two occasions (e.g., at winning and at redemption).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
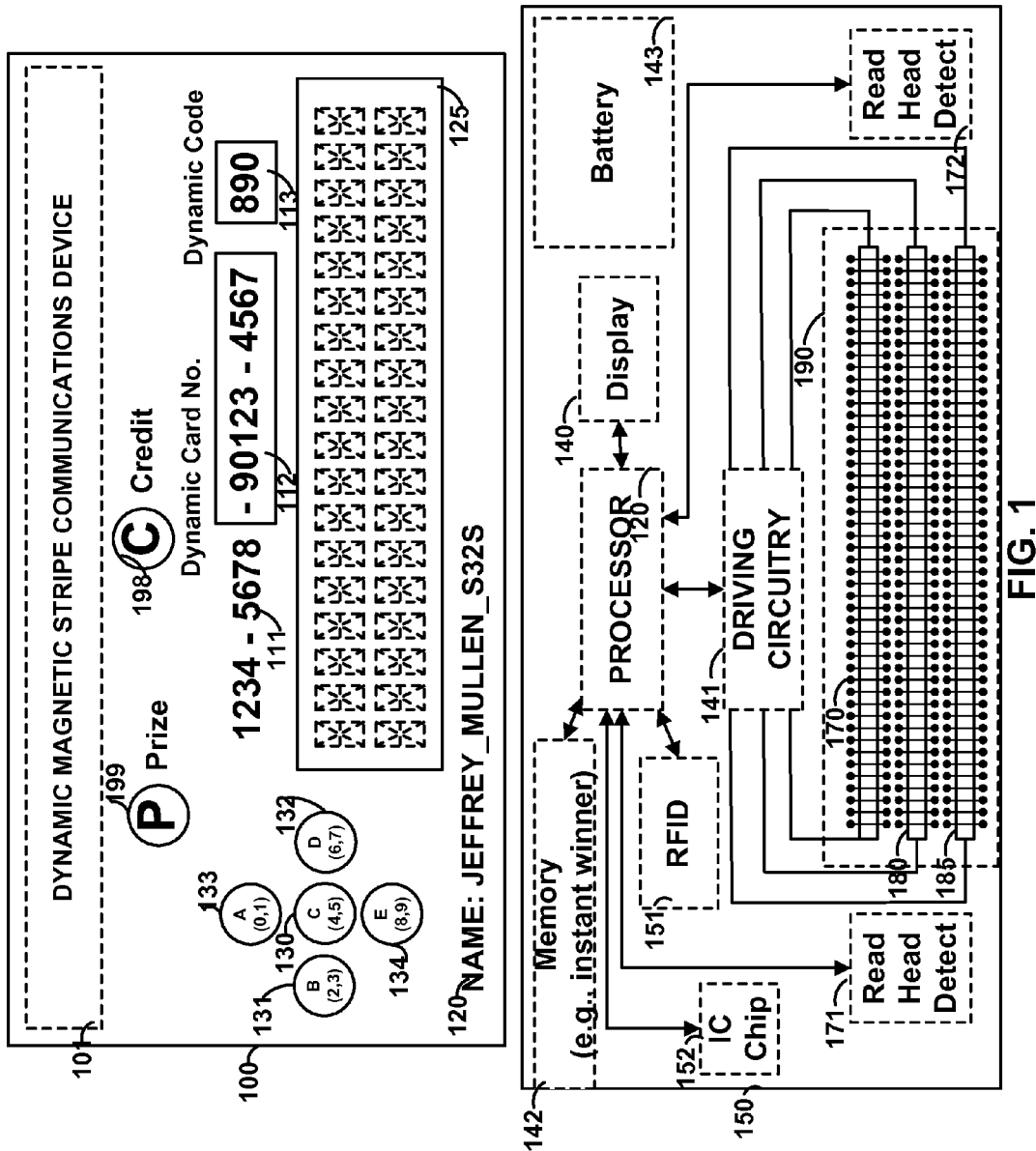
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to pay for an item on credit, but to forego the earning of points that would otherwise be earned for one or more chances to win a prize. Button 199 may also pay for an item on, for example, debit. Additionally, a chance may be provided regardless of whether points are forfeited for a purchase. Button 198 may cause, for example, a purchase to be made via credit (and points to be earned associated with the amount of the purchase). Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user's desire to purchase an item using a payment account (e.g., credit or debit account). Persons skilled in the art will appreciate that a chance to win a prize may be awarded with each purchase. Additional chances to win a prize, however, may be earned at a purchase by a user foregoing the points they would have earned on that purchase for a chance to win.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may store discretionary data codes associated with buttons of card 150. Such codes may be recognized by remote servers to effect particular actions. For example, one or more codes may be stored on memory 142 that is displayed based on an instant winner algorithm such that a user may redeem such codes for prizes. Such a code may be communicated, for example, in a magnetic stripe message, RFID message, and/or exposed chip message (e.g., EMV message) from a card. Memory 142 may also store types of actions that a user may select. Each type of action may be associated with a button. Or, for example, a user may scroll through a list of actions on a display on the front of the card (e.g., using buttons to scroll through the list). As per another example, a code may be stored indicative of a user's desire to pay with credit or forego points in an attempt to earn a prize. Such a code may be communicated, for example, in a magnetic stripe message, RFID message, and/or exposed chip message (e.g., EMV message) from a card.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
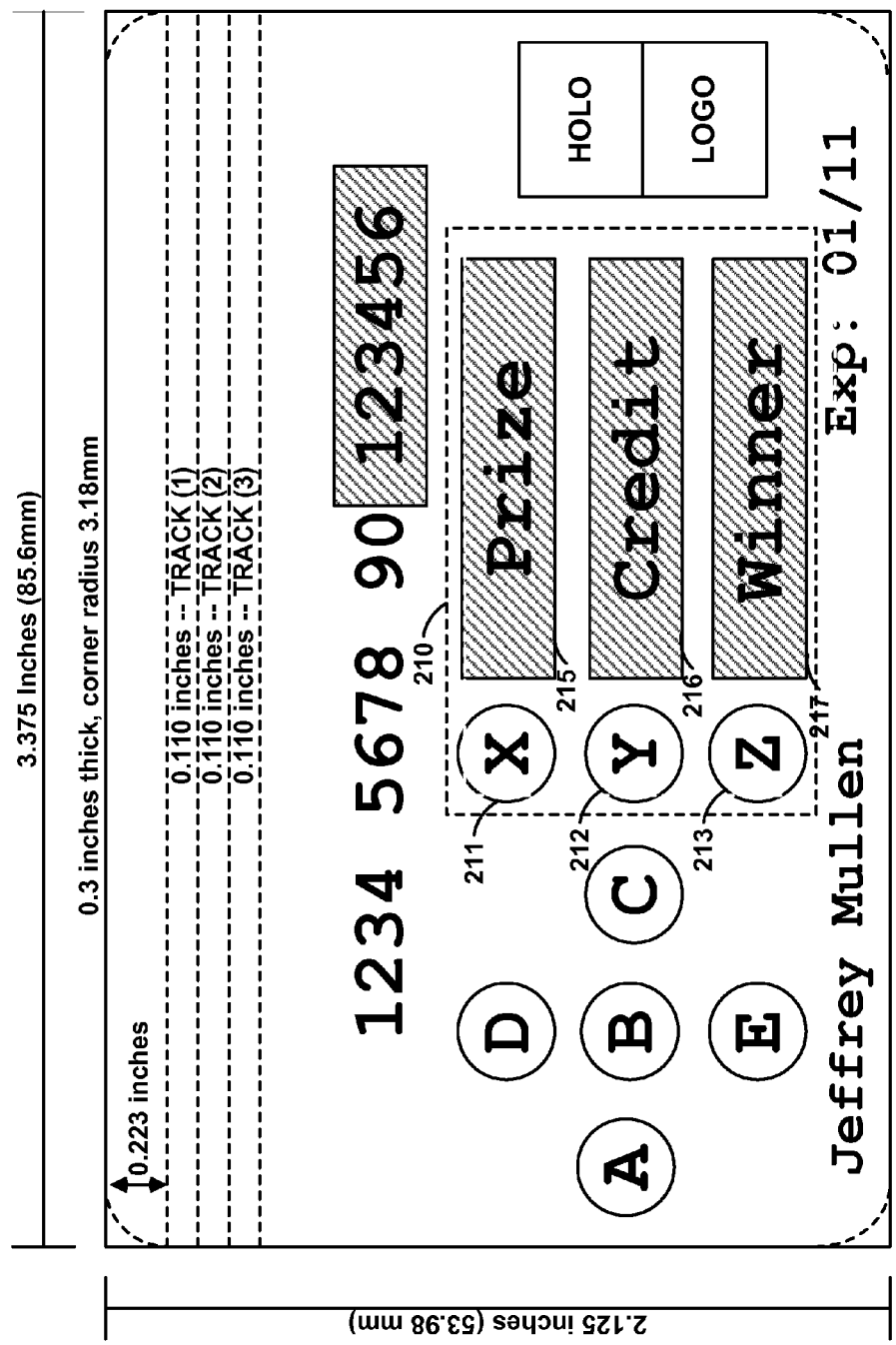
FIG. 2 is an illustration of a card constructed in accordance with the principles of the present invention.

FIG. 2 shows card 200 that includes button 211 associated with display 215, button 212 associated with display 216, and button 213 associated with display 217. Each button may be associated with a feature displayed in display 210. A user may press a button in order to communicate data representative of the feature through a magnetic stripe communications device or other communications device (e.g., RFID or IC chip). A light emitting diode (or other source of light) may be associated with each button to indicate to a user what feature was selected by a user. A user may be able to select multiple features such that multiple feature codes are communicated in tracks of magnetic stripe data communicated by a magnetic stripe communications device. Such codes may be provided in discretionary data fields. Such codes may be repeated on each track of communicated magnetic stripe data (e.g., repeated on tracks 1 and 2 or repeated on tracks 1, 2, and 3). In doing so, a user may associate multiple features to a purchase. A user may set that a prize feature be utilized by, for example, pressing button 211 for a purchase transaction. Such a prize feature may, for example, cause a purchase to be transacted via a payment account (e.g., credit) and, furthering the example, that points associated with the transaction be forfeited in exchange for one or more chances to earn a prize. Persons skilled in the art will appreciate that a prize may be won every time a purchase is transacted with button 211. In doing so, the whimsical and festive nature of such a feature may be increased. However, for example, the value of prizes won at every purchase may be lower than the prizes associated with a feature that provides for intermittent prize wins. A user may press button 212 to set that a purchase be transacted with, for example, a payment account. For example, a credit account may be utilized and points may be earned that are associated with the amount of the purchase. Button 213 may allow a user, for example, to receive an instant winner code. Display 217 may, for example, display that a card is an instant winner based on, for example, use or time. For example, when a card is an instant winner, display 217 may display "WINNER." An instant winner may expire based on time such that, for example, a user has a period of time to press button 213 to receive an instant winner code and redeem that code online. After an instant winner expires, for example, display 217 may go blank until the next instant winner occurs.

A card may randomly, based on time, indicate to a user that the user has won a prize. Such a feature may occur, for example, based on time. A user may have a period of time to make a purchase to claim the prize. For example, a user may have approximately, 24, 48, or 72 hours to claim a prize. Accordingly, a user may open his/her wallet or purse and see that the user has won a prize. The user may then make a purchase within a pre-determined amount of time by pressing a particular button (e.g. a "redeem prize" button). Information associated with this user selection may be communicate to a remote server (e.g., of a card issuer) via a magnetic stripe message from a dynamic magnetic stripe communications device, an RFID message from an RFID antenna, or a chip message from an exposed IC chip (e.g., an EMV chip). A card may allow for prizes, or chances to win prizes, to be earned in multiple ways. For example, any of the prize algorithms or prize chance algorithms discussed herein may be provided on a card. Accordingly, a card may provide a prize randomly based at least in part on time. The card may also allow a user to forego earning points for additional chances to win prizes.

The features associated with each card may be predetermined by a user. For example, a user may select features to place on a card when ordering a card. Additionally, a user may go to a card issuer's website and select attributes of features. For example, a user may visit a card issuer's website and select the particular offering that is to be purchased whenever a user selects the feature associated with button 211 and displayed on display 215. Information associated with a button may be displayed via a display or permanently printed, embossed, or laser engraved on a card. Card 200 may include a light sensing device to receive information via light pulses from a display (e.g., a television, mobile phone, or laptop display). A user may select to change the features or attributes of features from a card issuer's website and may reconfigure a card accordingly. Alternatively, a card may be provided with buttons and no descriptive information. A user may change the features or attributes of features associated with one or more buttons via a card issuer's website and remote processing may perform the associated processing as a result of on-card button selections. Different codes may be communicated depending on the feature or attributes of features on a card. Such codes may be changed via a wireless communications signal (e.g., a light-based communications signal). In doing so, processing may occur off-card at a remote server without the need to determine what feature a user associated with a code. Persons skilled in the art will appreciate that a card issuer may monitor the frequency and number of times that a user utilizes a particular feature. Additionally, the card may receive wireless communications signals (e.g., WiFi signals) associated with the modifications and additions).

A light receiver may be utilized in a variety of ways. For example, a mobile telephonic phone may have an application that is associated to a user's card. After a user makes a purchase, data may be pushed to the application indicative of whether or not a user won a prize. The application may also be loaded by a user such that the application pulls information from remote servers indicative of any recent purchases and, for example, prizes associated with those purchases. A prize may include one or more chances to win a prize via a particular game. For example, an application on a mobile telephonic device may provide a person with chances to partake in a particular game on the phone, where the game is associated with the type of merchant associated with the purchase and the chances to win are associated with the amount of the purchase. For example, a $10 purchase at a gas station may cause the phone application to allow a user to partake in a race of virtual cars for prizes one time. A $100 purchase at an online store may allow a user to partake in a spin the wheel for reward point games ten times. Prizes may take the form, for example, of discounts or coupons. Such discounts and coupons can take the form of codes that may be redeemed online or barcodes that may be redeemed in a store via a barcode scanner by displaying the barcodes on the display of the mobile telephonic device. Such codes may be communicated to a card via light pulses that are provided by a mobile telephonic device's application to communicate information to one or more light sensors on a card.

Figure 3:
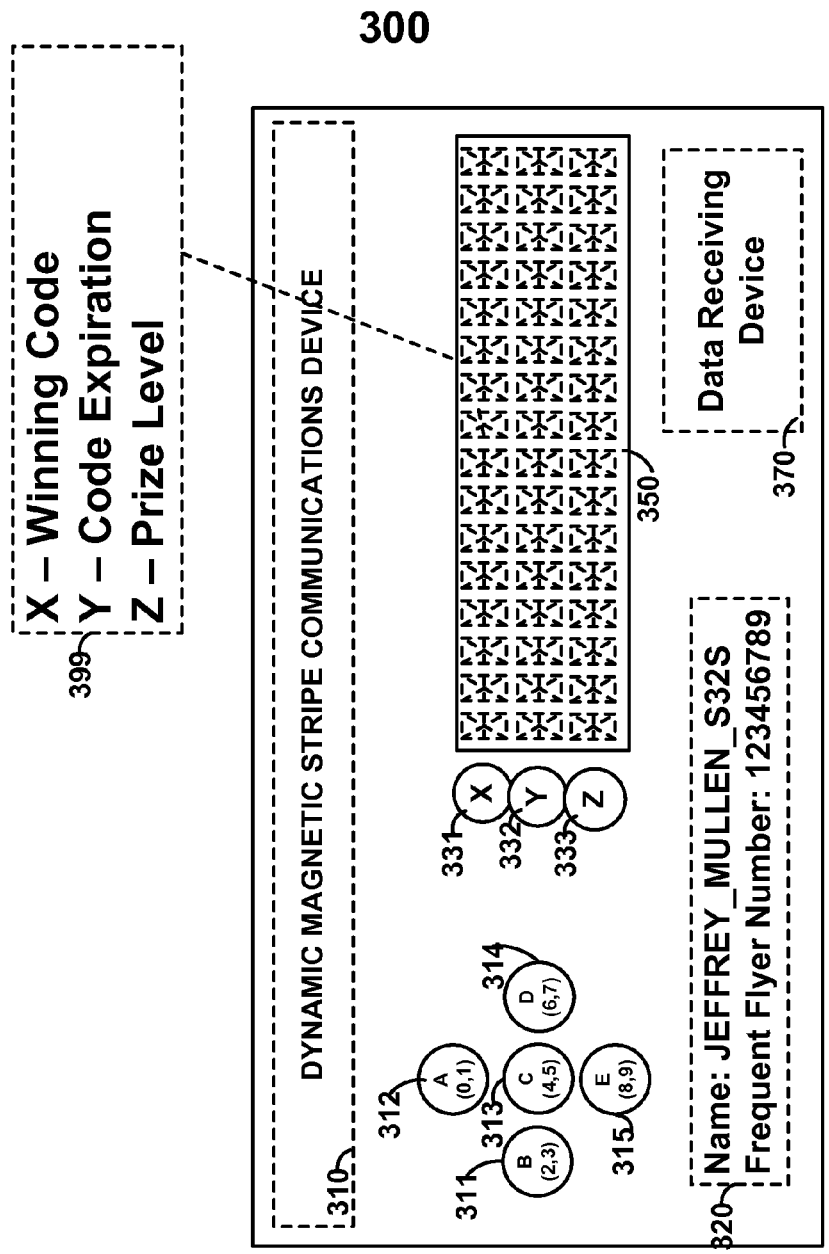
FIG. 3 is an illustration of a card constructed in accordance with the principles of the present invention.

FIG. 3 shows card 300 that may include dynamic magnetic stripe communications device 310, buttons 311-315, permanent information 320, display 350, data receiving device 370, and buttons 331-333. Button 331 may be associated with a first line of displayed information on display 350. Button 332 may be associated with a second line of displayed information on display 350. Button 333 may be associated with a third line of displayed information on display 350. Persons skilled in the art will appreciate that buttons 331-333 may actually be virtual buttons on display 350 and display 350 may be a capacitive touch screen. Data receiving device 370 may be a light or sound sensor for receiving information through received light or sound. Portion 399 may be displayed on display 350. The first line of portion 399 may be associated with button 331 and may, for example, cause a code to be communicated (e.g., with magnetic stripe data for authorizing a purchase transaction) to a magnetic stripe reader that is associated with a user's desire to display a winning code. The second line of portion 399 may be associated with, for example, button 332 of display 350 and may be utilized by a user to see the expiration date for a winning code. The third line of portion 399 may be utilized by a user to see the prize level associated with the code. Each line of portion 399 may directly display the associated information or may require a user to press the associated button one or more times for the information to be displayed and scrolled through. Persons skilled in the art will appreciate that display 350 may display multiple prizes. For example, display 350 may display the most recently earned prizes and buttons 331 and 333 may allow a user to scroll through all unexpired prizes. Button 332 may select a prize to reveal instructions on how to redeem the prize. The instructions to redeem a prize may be displayed, for example, across multiple lines of text or the single line of text associated with button 332. Accordingly, a highlight window (not shown) may be provided across the line of text on portion 399 associated with button 332.

Figure 4:
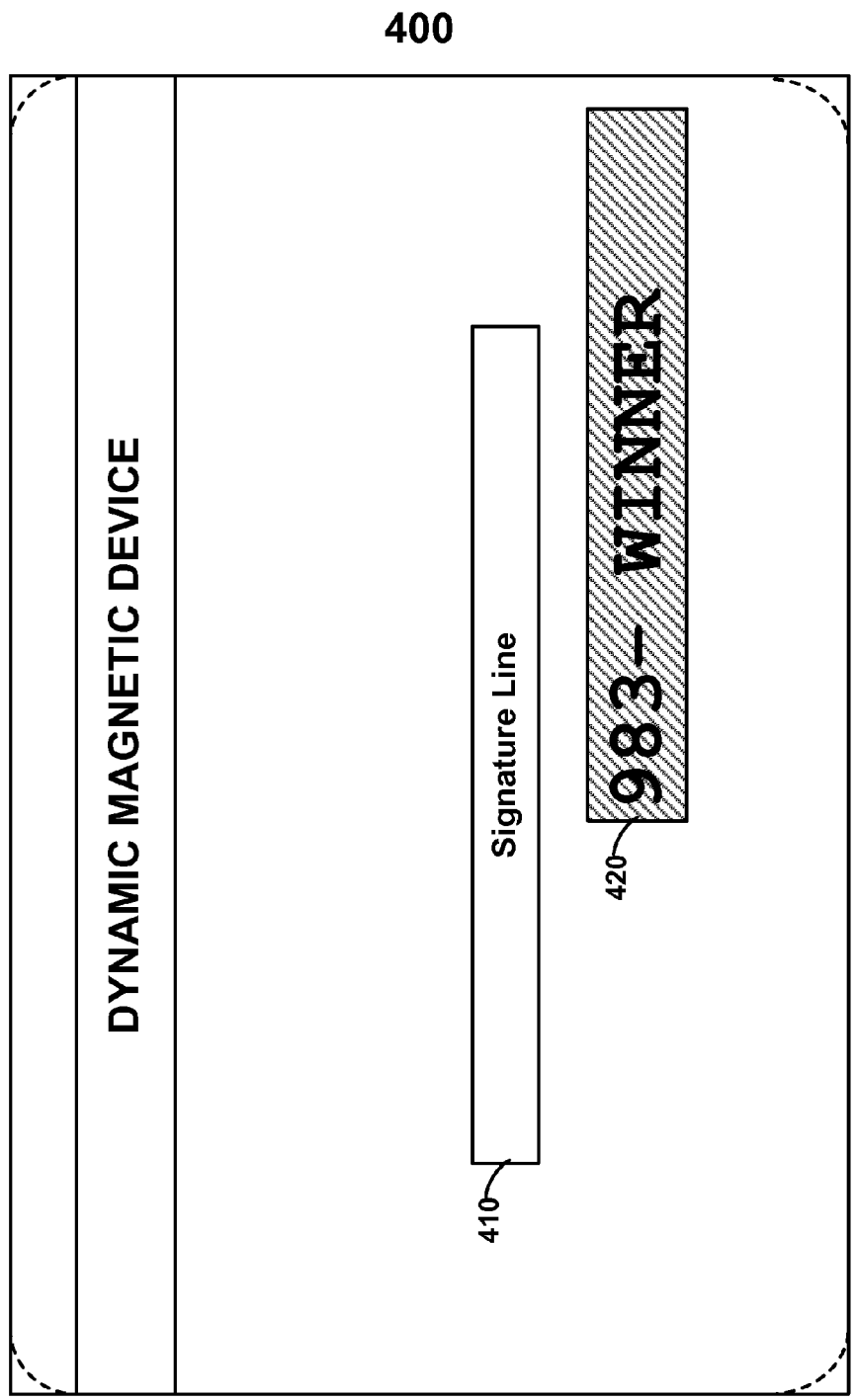
FIG. 4 is an illustration of a card constructed in accordance with the principles of the present invention.

FIG. 4 shows card 400 that may include signature line 410 and display 420. Persons skilled in the art will appreciate that card 300 of FIG. 3 may depict the obverse side of a card and card 400 of FIG. 4 may depict the reverse side of a card. Individual components of card 300 of FIG. 3 or card 400 of FIG. 4 may be provided on either side of a card or both sides of a card. More than one instance of a component may be provided on any side of a card (e.g., the same side as a component or a different side as a component). Persons skilled in the art will appreciate that a user may communicate feature codes representative of a user's on-card selection via codes that may be displayed visually and entered into a webpage as part of an online payment. A display may display not only a code for an online payment, but also indicia representative of the feature. In doing so, the user can confirm that the right feature was selected. Persons skilled in the art will appreciate that different codes for the same feature may be displayed and communicated via a dynamic magnetic communications device. In doing so, the security of the card may be increased. Additionally, the same or different codes may be communicated on different tracks of data to represent the selection of a particular feature. A code may be utilized, for example, to communicate information about whether a card is an instant winner (e.g., for a period of time).

Figure 5:
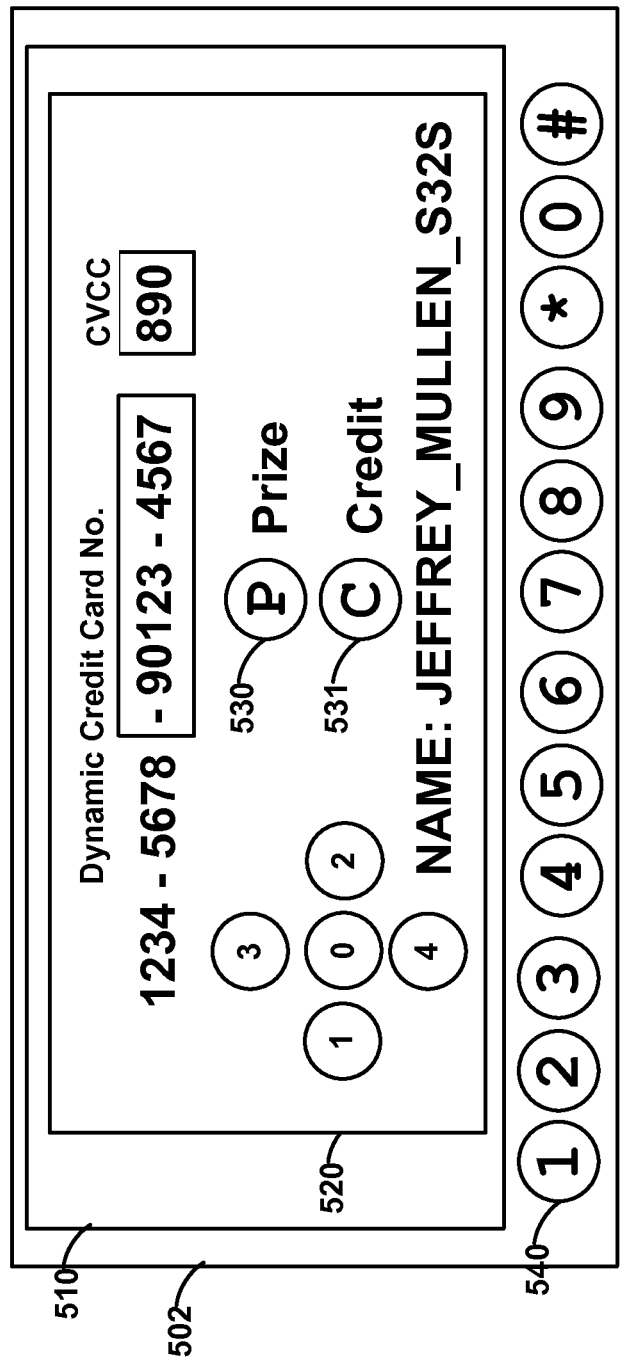
FIG. 5 is an illustration of a mobile device constructed in accordance with the principles of the present invention.

FIG. 5 shows mobile device 500, which may be a mobile telephonic device. Device 500 may include one or more physical buttons (e.g., button 540). Device 500 may include one or more display screens 510. Such a display screen may be touch sensitive such that virtual buttons (e.g., button 530 may be provided) on virtual card 520. Virtual card 520 may appear similar to a physical card described herein. A user may select different virtual cards by, for example, swiping his/her finger across a touch-sensitive display to scroll to the next virtual card. Mobile phone 502 may include a communications device operable to communicate data to a card reader. For example, mobile phone 502 may include an RFID antenna to communicate to an RFID reader, a pop-out IC chip panel operable to be fed into an IC chip reader, or a magnetic communications device having a magnetic emulator operable to communicate magnetic stripe data wirelessly to a read-head of a magnetic stripe reader. Virtual button 530 may be provided to indicate a user's desire to earn a prize change (e.g., instead of points) and pay for a purchase from a payment account. Virtual button 531 may be provided to indicate a user's desire to earn points and pay for an item with a payment account. After a purchase is authorized or settled, device 500 may receive information from a remote server indicative of the results of a prize determination. For example, the phone may receive information in the form of a text message where a user has to open the text message to see whether or not the user won. Similarly, an application may be provided on the device and the application may allow a user to see if a prize was won as well as manage prizes. A light sensor may be provided on a card so that a prize may be communicated, via pulses of light, from display 510 to a card. Accordingly, a card may include a button for redeeming a prize such that pressing a prize redemption button causes the prize to be communicated through a dynamic magnetic stripe communications device, RFID, and/or exposed IC chip.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A computing device, comprising:
a communications device;
a first button;
a second button;
a processor; and
a memory,
wherein a first data is associated with said first button and said first data is stored on said memory,
a second data is associated with said second button and said second data is stored on said memory,
said computing device is operable to detect a card reader,
said communications device is operable to communicate said first data upon detection of said card reader by said computing device, and
an instant winner algorithm is processed each time both said card reader is detected by said computing device and said first data is communicated by said communications device.

2. The card of claim 1, further comprising:
a display operable to display a winning code.

3. The card of claim 1, further comprising:
a display operable to display a winning code associated with a particular prize.

4. The card of claim 1, further comprising:
a display operable to simultaneously display a plurality of lines of data.

5. The card of claim 1, further comprising:
a light source operable to indicate an instant win.

6. The card of claim 1, further comprising:
a light source operable to blink during a redemption period of an instant win.

7. The card of claim 1, further comprising:
a first light emitting diode associated with said first button; and
a second light emitting diode associated with said second button.

8. The card of claim 1, further comprising:
an RFID; and
an IC chip.

9. The card of claim 1, wherein at least one of said first button and said second button is operable to allow a user to forego earning points in exchange for one or more chances to win a prize in addition to allowing said user a chance to win a prize associated with said processing of said instant win algorithm.

10. The card of claim 1, further comprising:
a touch sensitive display screen.

11. The card of claim 1, further comprising:
a wireless communications receiver.

12. A device, comprising:
a communications device;
a first button;
a second button; and
a memory,
wherein a first data is associated with said first button and said first data is stored on said memory, a second data is associated with said second button and said second data is stored on said memory, said communications device is operable to communicate said first data, and an instant winner algorithm is processed based on at least one programmed time.

13. The card of claim 12, wherein an instant win determined by said instant winner algorithm expires within a period of time.

14. The card of claim 12, further comprising:
a display operable to display a winning code.

15. The card of claim 12, further comprising:
a display operable to display a winning code associated with a particular prize.

16. The card of claim 12, further comprising:
a display operable to simultaneously display a plurality of lines of data.

17. The card of claim 2, further comprising:
a light source operable to indicate an instant win.

18. The card of claim 2, further comprising:
a light source operable to blink during a redemption period of an instant win.

19. The card of claim 12, further comprising:
a first light emitting diode associated with said first button; and
a second light emitting diode associated with said second button.

20. The card of claim 12, further comprising:
an RFID; and
an IC chip.

21. The card of claim 12, wherein at least one of said first button and said second button is operable to allow a user to forego earning points in exchange for one or more chances to win a prize in addition to allowing said user a chance to win a prize associated with said processing of said instant win algorithm.

22. The card of claim 12, further comprising a touch sensitive display screen.

23. The card of claim 12, further comprising a wireless communications receiver.

* * * * *